358-140. XR 2,938,076 SR

CIRCUITS EMBODYING TELEVISION PICK-UP TUBES

Filed Feb. 29, 1956 5 Sheets-Sheet 1

T 358/56

X 5086
X 5135
X 358/11
X 5055

Inventor
D. G. Perkins
By Glascock Downing & Seebold
Attys.

May 24, 1960 D. G. PERKINS 2,938,076

CIRCUITS EMBODYING TELEVISION PICK-UP TUBES

Filed Feb. 29, 1956 5 Sheets-Sheet 2

Inventor
D.G. Perkins
By Glascock Downing Seebold
Attys.

CIRCUITS EMBODYING TELEVISION PICK-UP TUBES

Filed Feb. 29, 1956 5 Sheets-Sheet 3

Inventor
D. G. Perkins
By Glascock Downing & Seebold
Attys.

Inventor
D. G. Perkins
By Mascock Downing & Seebold
Attys

Inventor
D. G. Perkins
By Glascock Downing & Seebold
Attys.

United States Patent Office 2,938,076
Patented May 24, 1960

2,938,076

CIRCUITS EMBODYING TELEVISION PICK-UP TUBES

Denis Gordon Perkins, Uplands, Gerrards Cross, England, assignor to Electric & Musical Industries Limited, Hayes, England, a company of Great Britain Filed Feb. 29, 1956, Ser. No. 568,622

Claims priority, application Great Britain Mar. 2, 1955

11 Claims. (Cl. 178—7.2)

Figure 1:
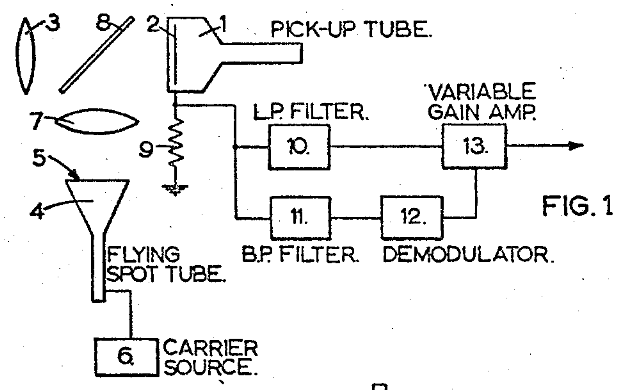

This invention relates to circuits embodying image pick-up tubes such as used for television and relates in particular to the provision of means for reducing distortion of the output of the tube due for example to variations in the sensitivity in the tube.

Distortion of the signals derived from a television or other image pick-up tube may arise due to variations of the sensitivity of the photo-sensitive surface, or of an electron multiplier in the tube, from one point to another over the area of said surface, and it is especially important to compensate for such distortion when the pick-up tube is used in a so-called "standards converter." Such a converter is used for example when it is desired to convert television signals having predetermined line and field frequencies into television signals having different line and/or field frequencies, or when it is desired to convert colour television signals of the field sequential type into colour television signals of the simultaneous type.

One object of the present invention is to reduce distortion of the output of an image pick-up tube, especially distortion due to variations in sensitivity of the photo-sensitive surface of the pick-up tube.

According to the present invention there is provided a circuit arrangement embodying an image which includes a target having a surface on which a charge pattern can be produced in response to an image, a conductive electrode adjacent to and capacitively associated with said surface, first means for scanning said surface to derive electrical signals corresponding to a charge pattern on said surface, sensitivity investigating means for additionally scanning said surface with the image of a light spot fluctuating in intensity at a frequency predetermined to cause the image of said spot to produce photo pulse signals on said conductive electrode, means for separating said photo pulse signals from image signals produced by said first scanning means, and correcting means responsive to said photo pulse signals for modifying operation of the circuit to reduce errors which would otherwise arise due to sensitivity variations of said pick-up tube.

Preferably said sensitivity investigating means comprises means for scanning said surface with a fluctuating light spot, and where the pick-up tube is so arranged that the image signal and the signal corresponding to said light spot are derived from the same output electrode it is convenient to arrange that the light spot has a fluctuation frequency which is high compared with the highest frequency of the desired image signal, so that the image signal and the signal corresponding to the fluctuating light spot can readily be separated by filter means.

A type of pick-up tube which is often used for direct image pick-up in television or in standards converter operates with cathode potential stabilisation and there is usually an electrode in the tube from which there can be derived a signal proportional to fluctuations of the overall light incident on the photo-sensitive surface of the tube at any instant. This signal is additional to the desired signal generated by the scanning electron beam and is known as a "photo-pulse" signal. For example in the case of a pick-up tube in which there is a signal plate capacitively associated with a photo-electrical sensitive mosaic screen, a photo-pulse signal can be derived from the signal plate as well as the desired video signals. In accordance with the invention, use may be made of this phenomenon by arranging that the signal corresponding to said light spot is derived from an electrode of said pick-up tube at which said fluctuating light spot produces a photo-pulse signal. Preferably moreover the fluctuation frequency of the light spot is arranged to be such as to set up at said output electrode a photo-pulse signal which is of higher frequency than could normally be resolved by the scanning electron beam in the tube.

As aforesaid the invention is especially applicable to the correction of errors in a derived image signal due to variations in sensitivity of the pick-up tube and in such applications of the invention it is arranged that the fluctuating light spot has a substantially uniform amplitude. In that case the correcting means is arranged to modify the image signal in response to amplitude variations of the derived signal corresponding to the light spot, the signal generated across the output load by the fluctuating light being in the nature of a carrier frequency signal modulated in amplitude in proportion to variations in the sensitivity of the pick-up tube. The light employed for scanning the photo-sensitive surface of the pick-up tube need only be focussed to the extent required for the investigation of sensitivity variations.

Although the invention is especially applicable to the reduction of distortion due to variations of sensitivity, it can also be employed for reducing distortion arising from other causes, as will hereinafter appear.

Figure 2:
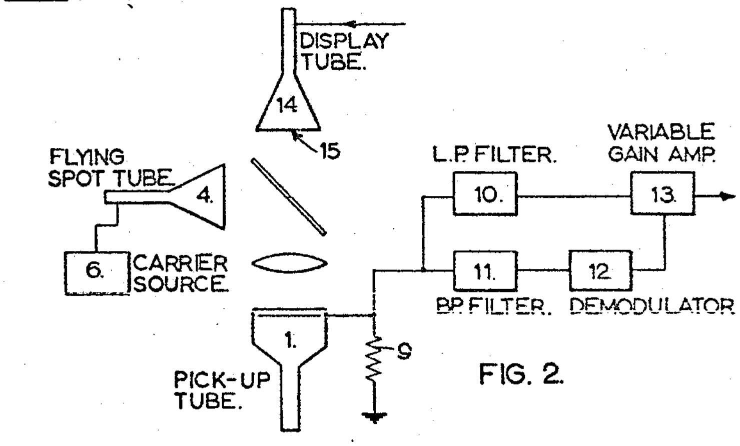
Figure 3:
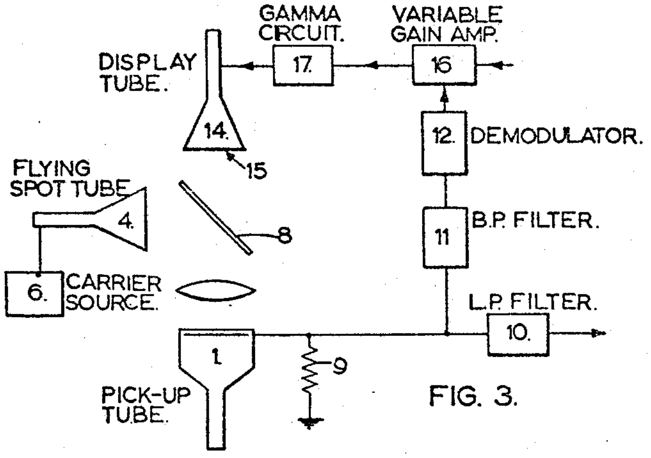
Figure 4:
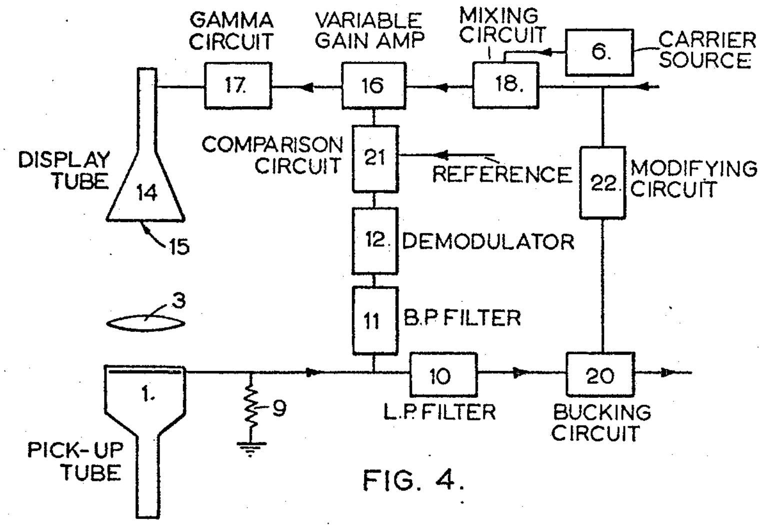
Figure 5:
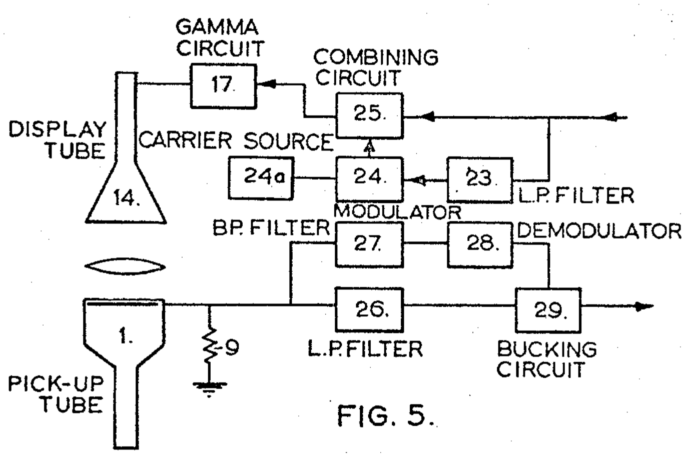
Figure 6:
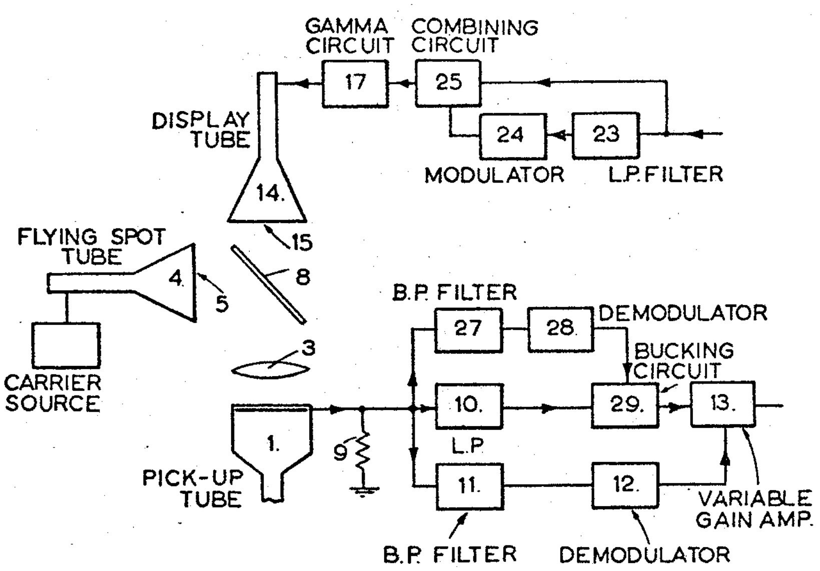
Figure 7:
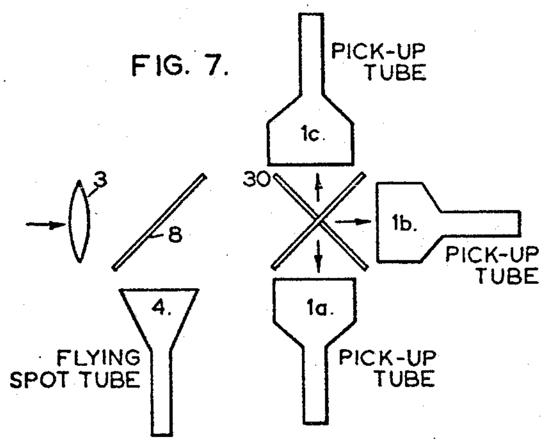
Figures 8, 9, 10A, 10B:
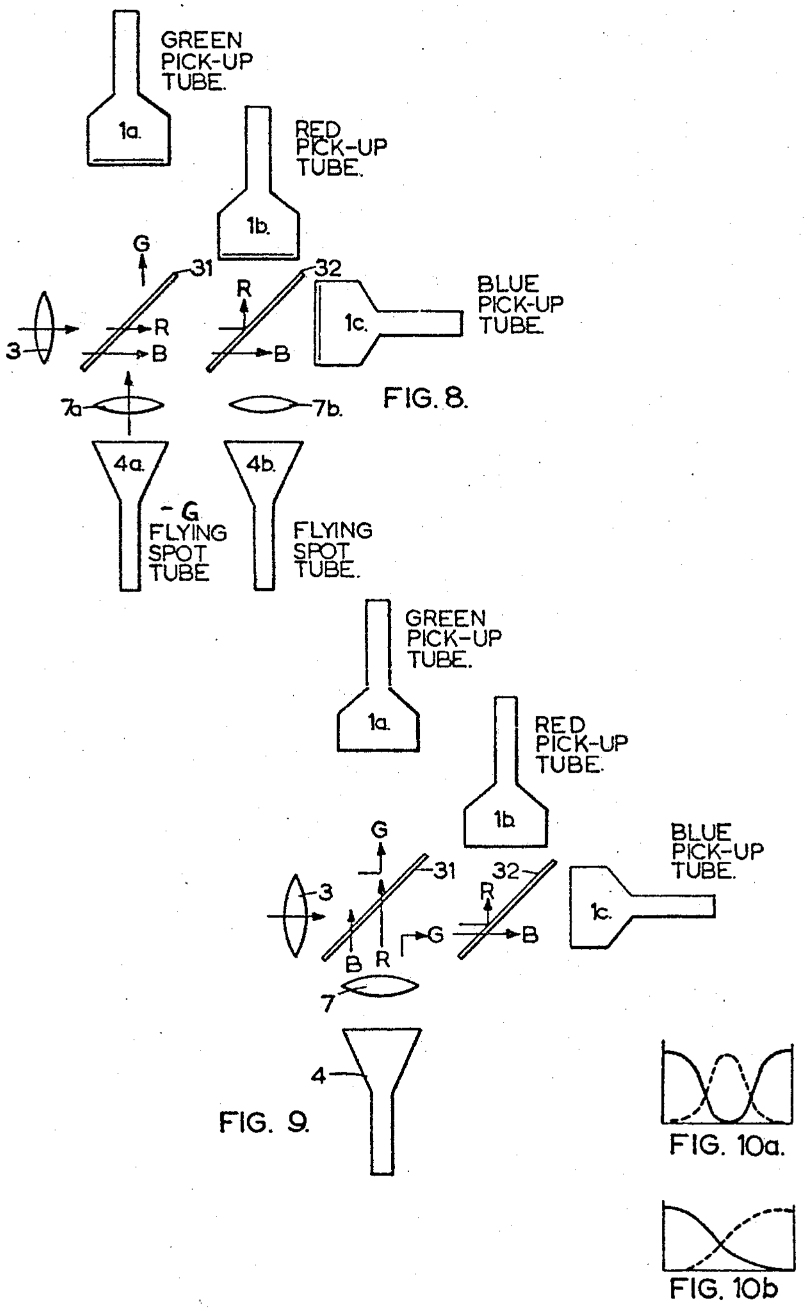
Figure 11:
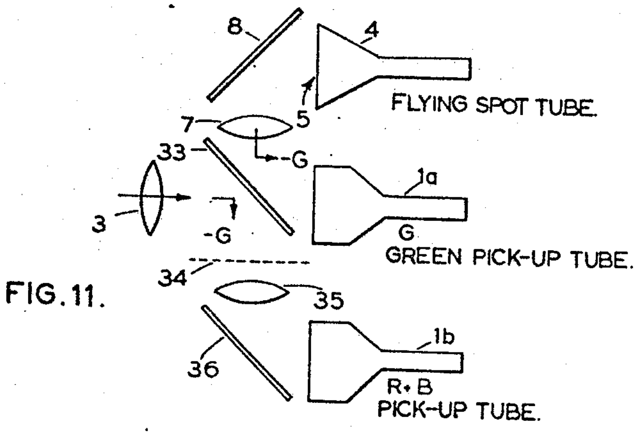
Figure 12:
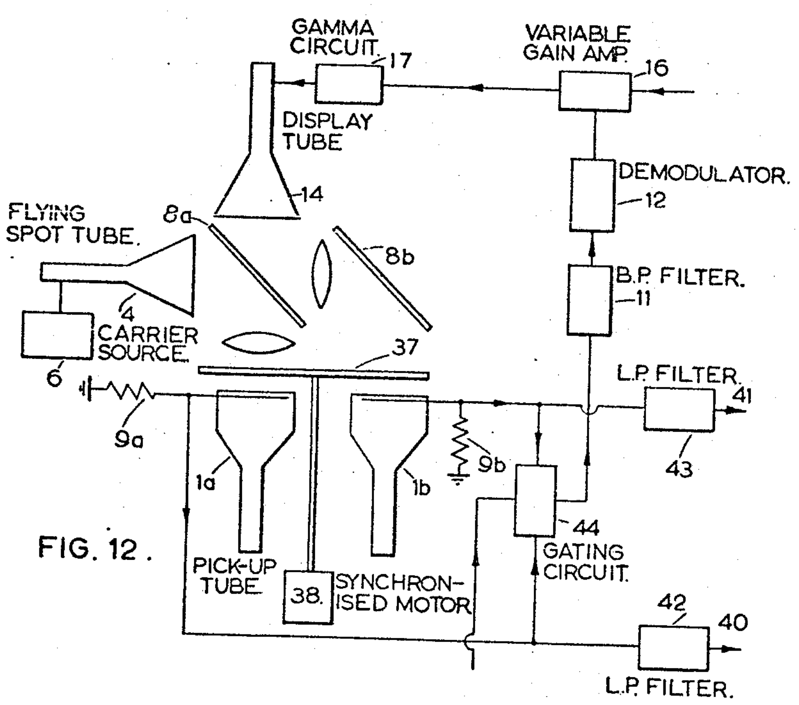

In order that the invention may be clearly understood and readily carried into effect, the invention will be described with reference to the accompanying drawings, in which:

Figure 1 illustrates one example of the present invention applied to a television camera of the direct pick-up type, Figure 2 illustrates an arrangement similar to Figure 1 employed in a standards converter, Figure 3 illustrates another example of the invention applied to a standards converter, Figure 4 illustrates a modification of Figure 3, Figure 5 illustrates another example of the invention applied to a standards converter so as to reduce distortion due to photo-pulse signals;

Figure 6 illustrates a combination of the arrangement shown in Figures 2 and 5,

Figure 7 illustrates an example of the invention applied to a three-tube colour television camera, Figure 8 is a modification of Figure 7, Figure 9 is another modification of Figure 7, Figures 10*a* and 10*b* are graphs relating to Figure 9, Figure 11 illustrates an example of the invention applied to a two-tube colour television camera, and Figure 12 illustrates an application of the invention to a standards converter for converting colour television signals of the field sequential type into colour television signals of the simultaneous type.

Referring to the drawing, reference 1 in Figure 1 illustrates the pick-up tube of a television camera of the direct pick-up type. It will be assumed that the tube is of the type which operates with cathode potential stabilisation, the construction of such a tube being described for example in the Proceedings of the Institute of Electrical Engineers, volume 97, part III, No. 50, page 383. The signal plate of the tube 1 is represented by the reference 2 and it will be appreciated that the signal plate is capacitively associated with a photo-electrically sensitive mosaic screen to form the target of the tube. A light image of the scene to be televised is projected on the screen by a lens represented at 3. The camera further comprises a cathode ray tube 4 having a fluorescent screen composed of a short-lag phosphor deposited on the end wall 5. This fluorescent screen is scanned by the electron beam of the tube at the same line and field frequency as employed in the pick-up tube 1, and substantially in register with it, and the beam is modulated in intensity by a periodic waveform having a frequency of 7 mc./s., this waveform being derived from any suitable circuit represented by the rectangle 6. The photo-sensitive surface of the pick-up tube is thus exposed to a light stimulus additional to the image to be picked up, the light stimulus being in the form of a light spot of rapidly fluctuating intensity which traces a raster on the fluorescent screen. This raster is projected on the photo-sensitive surface of the pick-up tube 1 by a lens represented at 7 and by a partially silvered mirror 8. An output load resistor 9 is connected to the signal plate 2 of the tube 1 and signals set up across the resistor 9 are applied in parallel to a low pass filter 10 and a high pass filter 11. Before application of the signals to the filters 10 and 11, they are amplified in known manner. The low pass filter 10 is arranged to have a pass band corresponding to the band width of the signals generated by the scanning electron beam of the tube 1 and this pass band may extend for example from 0 to 4.5 mc./s. On the other hand, the band pass filter 11 is arranged to pass signals in a small band of frequencies centred on 7 mc./s. Signals appearing in the output of the band pass filter 11 are applied to a demodulator 12 and the output of the demodulator is applied to a variable gain amplifier 13 in such manner as to vary the amplifier gain in response to the demodulator output so as to reduce errors due to sensitivity variations. The input signals to the amplifier 13 are derived from the low pass filter 10 and the variably amplified signals are passed to further stages in the video signal channel. The mean intensity of the light trace on the screen of the cathode ray tube 4 may correspond only to a relatively small part of the characteristic of the pick-up tube 1. Since the elements 6, 10, 11, 12 and 13 may all be of conventional constructions they are shown merely in block form in the drawing.

In operation of the arrangement described, the signals generated across the load resistor 9 of the pick-up tube 1 comprises three components. One component comprises the normal video signals generated by the scanning electron beam of the tube 1. A second component comprises the photo-pulse signals caused by variations in the scene illuminations. These photo-pulse signals are normally of low frequency and are removed by the normal levelling process to which the video-signals are subjected. The third component comprises photo-pulse signals having a centre frequency of 7 mc./s. and produced by the rapidly fluctuating light which is caused to scan the photo-sensitive surface of the tube 1 by the operation of the cathode ray tube 4. It will be appreciated that variations of the sensitivity of the photo-sensitive surface of the tube 1, over the area thereof, will produce an amplitude modulation of the 7 mc./s. signals, the band width of the modulation being dependent upon the degree of focus of the cathode ray tube 4, which need only be focussed to the extent required for the investigation. The first and third of the above-mentioned component signals, after amplification are separated by the filters 10 and 11 and it will be understood that the gain variations of the amplifier 13 responsive to the output of the demodulator 12 will substantially reduce distortion of the normal video signals due to variations of sensitivity of tube 1. If the resolving power of the pick-up tube 1 is sufficient for the scanning beam to generate signals in the pass band of the filter 11, the band width of the video signals may be artificially reduced by optical means, as by the use of a lenticular screen. The effect of sensitivity variations in the cathode ray tube 4 may be reduced by negative feedback techniques, for example by disposing a photo-electric cell to observe the light output of the tube 4 and employing the electrical signal generated by the photo-electrical cell as a negative feedback signal to the circuit 6.

The application of the invention shown in Figure 2 to a standards converter is generally similar to that shown in Figure 1 and corresponding parts of the two figures are denoted by the same reference numerals. In the case of Figure 2 however the scene illumination is provided by a cathode ray tube 14 having a fluorescent screen on its end wall 15 composed of a long-lag phosphor. The television signals which have to be subjected to standards conversion are applied to modulate the beam of the cathode ray tube 14 and so produce a light image of the signals on the fluorescent screen thereof. It will be assumed that the line and/or field frequency of the tube 14 differs from those of the tubes 1 and 4. In other respects, the operation of Figure 2 is similar to Figure 1 but since the brightness and detail of the scene displayed by the tube 14 (which will hereinafter be termed a display tube) are controllable, overloading of the tube 1 by the scene illumination combined with the light from the tube 4 which may be liable to occur in Figure 1 can be avoided. Moreover, by controlling the detail of the scene displayed by the tube 14 it is possible to ensure that the electron beam of the pick-up tube 1 does not generate a signal of a sufficiently high frequency to interfere with the "carrier" frequency of the signals due to the tube 4.

In some cases, with an arrangement such as shown in Figure 2, it may be desirable to use a phosphor in the display tube 14 having such a relatively short time lag that photo-pulse signals are liable to be set up across the load resistor 9 originating from the display tube 14, and of higher frequency than can be removed by levelling circuits. Such photo-pulse signals can be substantially balanced out with the aid of the signal generated by a photo-electric cell disposed to observe the mean output of the display tube 14 or by utilising a proportion of the original signals applied to the display tube 14. However in any case it is necessary to so choose the lag of the phosphor used in the display tube 14 or otherwise arrange that the lag does not produce any significant photo-pulse signals across the load resistor 9 at the aforesaid "carrier" frequency.

The arrangement shown in Figure 2 has the disadvantage that the noise content in the final signal output of the converter tends to be proportional to the amount of correction which is used. These disadvantages can be reduced by the arrangement shown in Figure 3 in which the cathode ray tube 4 for generating the rapidly fluctuating light is scanned at the same line and field frequencies as the display tube 14 and substantially in register with it. Moreover, in Figure 3, the output of the demodulator 12 is employed to vary the gain of an amplifier 16 in the path of the signals fed to the modulator electrode of the display tube 14. Reference 17 represents a gamma correcting circuit between the amplifier 16 and the tube 14 for compensating for curvature in the response of the display tube.

Assume that in the arrangement shown in Figure 3, the tubes 4 and 14 operate at a field repetition frequency of 150 fields per second, each field having 405 lines, and that the pick-up tube 1 operates at 50 fields per second, each field having 405 lines. Assume moreover that the effective band width of the signals applied to the tube 14 is limited to 9 mc./s., and that the scanning beam of the tube 4 is modulated at a frequency of 5 mc./s., with the beam sufficiently de-focussed so that the light fluctuation is not resolved. On the foregoing assumptions, the normal video signals generated by the scanning beam of the pick-up tube are limited to 3 mc./s. whereas the photo-pulse signals produced by the tube 4 occupy a band of frequencies centred on 5 mc./s. The video and photo-pulse signals can thus be separated by the filters 10 and 11 and the output of the filter 11, after demodulation, is employed to vary the gain of the amplifier 16 in the manner described with reference to the amplifier 13 in Figure 1.

The arrangements shown in Figures 2 and 3 have the disadvantage that they do not compensate for distortion due to sensitivity variations of the tube 14 or of the tube 4 or due to variations of the optical efficiency and the arrangement of Figure 4 is intended to reduce this disadvantage. It is generally similar to Figure 3 and corresponding parts are denoted by the same reference numerals, but it will be observed that the tube 4 has been dispensed with. Instead, a carrier frequency signal of 12 mc./s. is mixed in a mixing circuit 18 with the video signals which are applied to the display tube 14. Therefore light is superimposed on the scene displayed by the tube 14 fluctuating at 12 mc./s. and this investigates the photo-sensitive surface of the pick-up tube 1 in the same way as the fluctuating light produced by the tube 4 in Figure 3. It will be appreciated that the phosphor used in the tube 14 must have a time constant sufficiently short to allow a significant brightness modulation at the frequency of 12 mc./s. The same scanning standards for the tubes 14 and 1 are assumed as for Figure 3.

In operation of Figure 4, the filter 10 separates the normal video signal generated by the scanning beam of the tube 1 and transmits this signal to the video channel via a bucking circuit 20 whose function is described below. The band pass filter 11, which in this case is arranged to pass a band of frequencies centred on 12 mc./s., transmits the photo-pulse signals due to the 12 mc./s. carrier wave to the demodulator 12. The output of the demodulator 12 is applied to a comparison circuit 21, in which the demodulator output is compared with a reference potential and any difference is employed to vary the gain of the amplifier 16, thus completing a feedback loop which tends to maintain constant the level of the signal derived from the demodulator 12, and thereby also tending to maintain the correct level of output video signals. The bucking circuit 20 is provided to reduce the photo-pulse signals set up across the load resistor 9 due to the video signal content in the display of the tube 14. Such "video" photo-pulse signals are liable to appear owing to the short lag of the phosphor of the tube 14. The output of the low pass filter 10 should be substantially free from distortion due to sensitivity variations, and as the time constant of the phosphor used in the tube 14 is very short the "video" photo-pulse signals should be fairly closely related to the actual waveform of the video signals applied to the tube 14. Consequently the bucking circuit 20 is fed through a modifying circuit 22 with a portion of the input signal applied to the display tube 14. The modifying circuit 22 may for example limit the band width of the signal applied to the bucking circuit 20 to 3 mc./s. and modify them in a manner requisite to produce satisfactory cancellation of the undesired photo-pulse signals when mixing occurs in the bucking circuit.

The arrangements so far described are arranged to reduce distortion due to variations of the sensitivity of the pick-up tube. Figure 5 illustrates an arrangement in which a similar technique is used to reduce distortions in the output of the pick-up tube of a standards converter due to photo-pulse signals. Thus as shown in Figure 5 a portion of the signals applied to the display tube 14 are by-passed through a low pass filter 23 and a modulator 24. Assume that the input signals cover the frequency range of from 0 to 4.5 mc./s. and the low pass filter is arranged to cut-off at 3 mc./s. The modulator 24 causes the output of the filter 23 to modulate a carrier wave of frequency (say) 9 mc./s. from source 24a and the modulated carrier wave is then combined with un-bypassed signals in a combining circuit 25. The combined signals from the input to the display tube 14, the phosphor of which is arranged to have a time constant which is short enough to provide a sharp brightness modulation at 3 mc./s. and significant brightness modulation at 9 mc./s. Assume that the field frequency of the display circuit is 50 fields per second with 625 lines per field and that the pick-up tube 1 operates with a field frequency of 50 fields per second, 405 lines per field. The output of the tube 1 set up across the load resistor 9 is applied in parallel to the low pass filter 26 and to a band pass filter 27 the cut-off of the low pass filter being 3 mc./s. and the pass band of the filter 27 being centred on 9 mc./s. The filter 27 is followed by a demodulator 28 and the output of the demodulator is fed to a bucking circuit 29 having a second input derived from the low pass filter 26.

In operation of Figure 5, filter 26 selects the normal video signals generated by the tube 1 and passes them to the video signal channel through the bucking circuit 29. The band pass filter 27 selects the photo-pulse signals corresponding to the modulated 9 mc./s. carrier wave superimposed on the display. The photo-pulse signals are of course sensitive to sensitivity variations of the conversion. The demodulator 28 produces an output corresponding to the modulation of the 9 mc./s. carrier wave, namely video signals having frequencies up to 3 mc./s. and any superimposed modulation due to sensitivity variations, and this output is employed in the circuit 29 to cancel "video" photo-pulse signals which would otherwise be passed to the video signal channel. Video signals may be transmitted to the output load resistor 9 by a photo-pulse action having frequencies up to 4.5 mc./s. but the video output is limited to 3 mc./s. and photo-pulse signals with frequencies up to 3 mc./s. are reduced by the arrangement described.

With the arrangement shown in Figure 5 an undesirable signal corresponding to the modulated 9 mc./s. carrier whose frequency is dependent upon the conversion being performed may be generated by the scanning beam of the pick-up tube 1, dependent on the resolving power of the conversion. These signals may present themselves as bright spots when transmitted signals are reconstituted in a receiver. Such signals can moreover be minimised by arranging that the carrier wave has a frequency which is not exactly 9 mc./s. but is a multiple of line frequency and undergoes a phase change of 180° between successive fields and by employing spot wobble or the equivalent in the display tube and/or the pick-up tube. This implies that the spot is caused to oscillate about the particular line being scanned at a frequency which is high compared with the line scanning frequency. The resulting effect is to produce averaging out of intensities of lines in successive fields at points where a bright spot occurs due to the 9 mc./s. carrier, since a bright spot on a line in one field is accompanied by a dull spot on a corresponding line in the next field. Alternatively velocity modulation of the spot in the line direction may be employed, this velocity modulation having the same frequency as the carrier. This means that the beam scans what would be a bright spot with an increased velocity so that the signal produced corresponding to that spot is proportionately reduced so that the charge stored in the pick-up tube 1 corresponding to the 9 mc./s. carrier is substantially uniform along any line.

The output of the demodulator 28 in Figure 5 may also be employed, if desired, to reduce distortion due to sensitivity variations. Thus, the output of the demodulator 28 may be passed through a low pass filter or time-constant circuit, the band width or time constant of which is chosen to suit the rate of change of the sensitivity variations for which it is desired to compensate. The output of the filter or circuit is compared with a similarly distorted portion of the original signal to provide a signal proportional to the sensitivity variations. This signal may then be used to control an amplifier in the input signal path to the display tube 14, thus completing a feedback loop similar to that in Figure 4.

Figure 6 shows an arrangement in which provision is made for reducing distortion due to photo-pulse signals as in Figure 5 and provision is made for reducing distortion due to sensitivity variations, as in Figure 2, by means of the cathode ray tube 4, band pass filter 11, demodulator 12 and amplifier 13. Assuming the scanning standards of Figure 5, the carrier wave applied to modulate the beam of the tube 4 may have a frequency of 3.5 mc./s., the tube 4 being operated at the same line and field rate as the pick-up tube 1. Photo-pulse signals therefore appear across the output load 9 corresponding to the 3.5 mc./s. carrier, modulated in amplitude in accordance with sensitivity variations, and these signals are separated by the filter 11 whose band pass is centred on 3.5 mc./s., and are demodulated in the demodulator 12. The output of the demodulator is then employed to vary the gain of the video signal amplifier 13 as in Figure 2.

The arrangement of Figure 6 may be modified by scanning the cathode ray tube 4 at the same line and field rates as the display tube 14, and in this case the output of the demodulator 12 may be used to control the amplification of the signal applied to the display tube 14 as described with reference to Figure 3.

The invention is not confined to cameras and converters employing only a single pick-up tube, and Figure 7 illustrates an application of the invention to a colour television camera employing three pick-up tubes. In this case the cathode ray tube 4 produces the fluctuating light for scanning each of the three pick-up tubes 1*a*, 1*b* and 1*c*, the light from the tube 4 being split by crossed dichroic mirrors 30 which are used to split the scene illumination, transmitted to the pick-up tubes through the objective lens 3 into its component colours. The pick-up tube 4 is of course required to produce white light. In Figure 7 each pick-up tube may have the output circuit similar to that shown in Figure 1.

Figure 8 illustrates another application of the invention to a colour television camera having 3 pick-up tubes. In this case the tube 1*a* is responsive to the Y or green component of the scene illumination, the tube 1*b* being responsive to the red component and the tube 1*c* being responsive to the blue component, the dichroic mirrors 31 and 32 having appropriate transmission and reflection characteristics. Two cathode ray tubes 4*a* and 4*b* are employed, corresponding to the tube 4 of Figure 7, and light produced by the tube 4*a* is arranged by filtering or otherwise to contain no green component and is projected on the photo-sensitive surface of the pick-up tube 1*a* alone. On the other hand, light from the tube 4*b* is divided between the tube 1*b* and 1*c*. This arrangement allows the modulation frequency applied to the cathode ray tubes 4*a* and 4*b* to be different, to take advantage of the fact that different resolutions may be required from the different pick-up tubes.

Figure 9 illustrates another arrangement which can be adopted in a three-tube colour television camera. In this case the phosphor used in the cathode ray tube 4 may be arranged to produce a white, yellow or cyan light. Figures 10*a* and 10*b* respectively illustrate suitable transmission and reflection characteristics for the dichroic mirrors 31 and 32. In each case the transmission characteristic is shown in full lines and the reflection characteristic in dotted lines.

Figure 11 illustrates an application of the invention to a colour television camera in which only two pick-up tubes are used, although operating on a three colour system. In this camera the dichroic mirror 33 transmits the green or Y component of the scene illumination to the pick-up tube 1*a* and reflects the remaining components of the scene illumination to the pick-up tube 1*b* through a focus at filter 34. The light passing through the filter 34 is focussed on the pick-up tube 1*b* by a lens 35 and mirror 36. The filter has narrow vertical strips corresponding alternately to yellow and cyan and pick-up tube 1*b* operates to produce signals of relatively low definition corresponding to the red and blue components of the scene. The fluctuating light used for scanning the photo-sensitive surfaces of the pick-up tubes 1*a*, 1*b* is produced as before by the cathode ray tube 4, this tube having a phosphor which yields a white or yellow or cyan light. In this arrangement it is desirable that the transmission of green light from the cathode ray tube 4 through the different strips of the filter 34 should be the same, or that the spot size at the filter should be large compared with the width of the filter strips.

In standard converters using more than one pick-up tube, such for example as the so-called "chromacoder," and in which the scene is displayed on separate tubes, then each combination of display tube and pick-up tube may be operated as described with reference to any one of Figures 2, 3, 4, 5 and 6. If, however, the scene is displayed by a single display tube then arrangements similar to those suggested in Figures 7, 8, 9 and 11 may be used.

Figure 12 discloses another arrangement of a standards converter for converting field sequential colour television signals into simultaneous colour television signals, the arrangement allowing an economy of components. One component signal is converted by an arragement such as described with reference to Figures 2, 3, 4, 5 or 6. For the other two signal components a single display tube 14 is employed, in association with a single tube 4 for producing a fluctuating light trace, and two mirrors 8*a* and 8*b*, the former of which is partially transparent. References 1*a* and 1*b* denote two pick-up tubes to which the light from the display tube and the tube 4 is commutated in the appropriate sequence by a shutter 37 operated by a synchronized motor 38. The video signals set up across the output load resistors 9*a* and 9*b* of the respective pick-up tubes 1*a* and 1*b* are applied to separate signal channels 40 and 41 respectively through low pass filters 42 and 43. The load resistors 9*a* and 9*b* are however assoicated with a single band pass filter 11, corresponding to the filter 11 of Figure 3, for example, and signals from the resistors 9*a* and 9*b* are gated alternately to the filter 11 by a gating circuit 44 which is operated by switching pulses synchronous with the motor 38 and with the fields of the signals applied to the display tube 14. The output of the band pass filter 11 comprises photo-pulse signals corresponding to the fluctuating light produced by the cathode ray tube 4 and derived from that one of the pick-up tubes which is exposed to the display of the tube 14 at the corresponding time. The output of the filter 11 is demodulated by the demodulator 12 and employed to vary the gain of the amplifier 16, as in Figure 3.

In all the arrangements so far described the pick-up tubes employ electron beam scanning, but the invention may be applied to pick-up tubes which employ light spot scanning. With some such tubes, the action of the scanning spot is to cause an increase in the charge caused by the scene illumination until a condition is reached when photo-emission from the photo-sensitive surface of the tube is suppressed. If, however, the pick-up tube is stabilised by an electron beam, as described for example in co-pending United States patent application Serial No. 471,038, the investigation of variations of sensitivity may preferably be carried out soon after the target has been re-stabilised using an arrangement similar to Figure 1. In this case adequate correction for sensitivity variations should be possible if the the fluctuating light spot is displaced a few lines behind the stabilising beam. Moreover, the cathode ray tube which is used to provide the scanning light spot for generating the video signals may also be used to provide the fluctuating light employed for investigating sensitivity variations. This can be achieved by employing a tube containing two guns, the beam produced by one of the guns being modulated with the carrier wave and displaced a number of lines behind the scanning light spot so that the fluctuating spot effects scanning after the target has been re-stabilised by the electron beam. Alternatively a single beam tube may be used if spot wobble is employed to displace the scanning spot a number of lines if the spot is switched to a low level of brightness in synchronism with the wobble, so that the signal produced in the pick-up tube output when the scanning spot is so switched may be observed and used as a measure of the sensitivity at the corresponding point of the target.

For tubes which employ light spot scanning and are of the so-called leaky type, such as described for example in United States Patent No. 2,153,163, the investigation of sensitivity variations is preferably carried out before the target is influenced by the scanning light spot. Such investigation may be carried out by a separate cathode ray tube as in Figure 1 or by the spot wobble technique indicated above, the direction of the wobble being such that the investigation precedes the normal scanning action. In this case the wobble may be in the line direction. The scene illumination has to be limited so that a "margin" is left for the investigating light to generate photo-electrons.

Since the investigating signal passes directly through the display and pick-up tubes synchronous detection may be employed. Furthermore, spurious signals which are liable to be produced when the beam of the cathode ray tube 4 is blacked out during return times may be suppressed by suitable pulsing techniques, if required. Moreover, the raster produced on the tube 4 may be advanced to allow for delay in the correcting circuits if necessary.

With arrangements such as shown in Figure 4, if the "carrier" frequency of the investigated signal is high compared with the video signal band width, so that the correction circuits are relatively rapid in operation, it may be possible to utilise the signal output of the demodulator 12 to linearise the converter, thereby correcting automatically for gamma variations of the display tube 14. In some cases the output of the demodulator 12 may also be added to the video signals in suitable proportion to correct for black level errors produced by variations of sensitivity.

To minimise errors in the correction for sensitivity variations such as may be caused by overloading the pick-up tube by the scene illumination, it may be preferable to delay the fluctuating light spot with respect to the scanning electron beam of the pick-up tube as suggested for the case of pick-up tubes employing light spot scanning.

The invention has been described as applied to pick-up tubes in which the scene illumination is projected directly onto the surface which is scanned by the electron beam or light spot, the said surface being of course a photo-electrically sensitive surface. The invention is however applicable to pick-up tubes in which the scene illumination is caused to produce an electron image which is in turn projected on the target scanned by the electron beam. In such application, use is made of photo-pulse signals appearing on the mesh or photo-cathode in the image section of the tube.

What I claim is:

1. A circuit arrangement embodying an image pick-up tube, means including a target in said tube for converting a light image into a charge pattern on a surface of said target, a conductive electrode adjacent to and capacitively associated with said surface, an output circuit connected to said conductive electrode first scanning means for scanning said surface to produce electrical signals in said output circuit of a predetermined frequency range corresponding to a charge pattern on said surface, sensitivity investigating means including further scanning means for additionally scanning said surface with the image of a light spot fluctuating in intensity at a frequency higher than frequencies in said frequency range, predetermined to cause the image of said spot to produce photo pulse signals on said conductive electrode, means for separating said photo pulse signals from image signals produced by said first scanning means, and correcting means responsive to the amplitude of said photo pulse signals for varying the amplitude of said image signal to reduce errors which would otherwise arise due to sensitivity variations of said pick-up tube.

2. A circuit arrangement embodying an image pick-up tube, means including a target in said tube comprising a photo-electrically sensitive element for converting a light image into a charge pattern on one surface of said target, a conductive electrode adjacent to and capacitively associated with one surface of said element, first scanning means for scanning said surface to produce electrical signals of a predetermined video frequency range corresponding to a said charge pattern on said surface, sensitivity investigating means including further scanning means for additionally scanning said surface with the image of a light spot fluctuating in intensity at a frequency higher than frequencies in said predetermined video frequency range, to produce photo pulse signals at said conductive electrode, filter means for separating signals in said video frequency range from signals of higher frequency, thereby to separate signals produced by said first scanning means and corresponding to said light image from said photo pulse signals, and correcting means responsive to the amplitude of said photo pulse signals for varying the amplitude of said signals corresponding to said light image to reduce errors which would otherwise arise due to sensitivity variations of said pick-up tube.

3. An arrangement according to claim 2, said means for additionally scanning said surface comprising means for producing a fluctuating light spot having a substantially uniform amplitude.

4. An arrangement according to claim 2, comprising a cathode ray tube and a fluorescent screen, means for scanning said screen in synchronism with said first scanning means and with a modulated beam to produce said fluctuating light spot and to cause said spot to scan a raster, means for projecting said raster on said photo sensitive surface in substantial registry with the scanning raster produced on said surface by said first scanning means, and said correcting means including an amplifier for variably amplifying the image signal derived from said pick-up tube in response to amplitude variations of said photo pulse signals.

5. An arrangement according to claim 3, comprising a cathode ray tube having a fluorescent screen and means for applying image signals to said cathode ray tube, thereby to produce said light image on said screen, and means for projecting said light image on said surface.

6. An arrangement according to claim 5, means being provided for applying additional signals to said cathode ray tube, said additional signals being operative to superimpose said fluctuating light spot of said light image displayed on said fluorescent screen, said correcting means including an amplifier for variably amplifying the image signal applied to said cathode ray tube in response to said amplitude variations of the signal derived from said pick-up tube corresponding to said light spot.

7. An arrangement according to claim 5, comprising a further cathode ray tube having a fluorescent screen, means for applying signals to said further cathode ray tube to produce said fluctuating light spot, means operative to cause said spot to scan a raster, means for projecting said raster on said photo sensitive surface to register substantially with the projected scanning raster of said first mentioned cathode ray tube, and said correcting means including an amplifier for variably amplifying the image signal applied to said first mentioned cathode ray tube in response to amplitude variations of the signal derived from said pick-up tube corresponding to said light spot.

8. An arrangement according to claim 6, said correcting means comprising means for demodulating the signal derived from the pick-up tube and corresponding to said light spot, means for comparing the demodulated signal with a reference signal to derive a difference signal, means operative to provide said variable amplification being responsive to said difference signal.

9. An arrangement according to claim 7, said correcting means comprising means for demodulating the signal derived from the pick-up tube and corresponding to said light spot, means for producing a reference signal means for comparing the demodulated signal with said reference signal to derive a difference signal, said amplifier being responsive to said difference signal.

10. An arrangement according to claim 2 comprising a cathode ray tube having a fluorescent screen, means for applying image signals to said cathode ray tube to cause a light image to be produced on said fluorescent screen, said pick-up tube being disposed for exposure to said light image, means for applying further signals to said cathode ray tube to produce said fluctuating light spot superimposed on said light image, means for modulating said fluctuating light spot with a signal related to said image signals, and said correcting means being operative to balance out photo pulse components of said image signals in response to the signal derived from said pick-up tube corresponding to said light spot.

11. A circuit arrangement embodying a plurality of image pick-up tubes, each of said tubes including a target comprising a photo-electrically sensitive element for converting a light image into a charge pattern on one surface of each of said targets corresponding to different colour components of said light image and a conductive electrode adjacent to and capacitively associated with one surface of the element, first scanning means, means for scanning said surfaces to produce respective electrical signals of a predetermined video frequency range corresponding to said charge patterns, means for additionally scanning each of said surfaces with a corresponding colour component of a light spot fluctuating in intensity at a frequency higher than frequencies in said predetermined video frequency range, to produce photo pulse signals at each of said conductive electrodes, filter means for separating signals in said video frequency range from signals of higher frequency, thereby to separate the respective signals produced by said first scanning means and corresponding to the respective colour components of said light image from the respective photo pulse signals, and respective correcting means for each of said tubes, being responsive to the respective amplitudes of said photo pulse varying in amplitudes of said respective signals corresponding to said light image to reduce errors which would otherwise arise due to sensitivity variations of said pick-up tubes.

References Cited in the file of this patent

UNITED STATES PATENTS

| | | |
|---|---|---|
| 2,532,793 | Sziklai | Dec. 5, 1950 |
| 2,552,070 | Sziklai | May 8, 1951 |
| 2,560,168 | Goldsmith | July 10, 1951 |
| 2,619,531 | Weighton | Nov. 25, 1952 |

FOREIGN PATENTS

| | | |
|---|---|---|
| 708,841 | Great Britain | May 12, 1954 |